United States Patent
Du et al.

(10) Patent No.: US 10,790,072 B2
(45) Date of Patent: Sep. 29, 2020

(54) CONDUCTIVE POLYMER COMPOSITE MATERIAL AND CAPACITOR

(71) Applicant: Industrial Technology Research Institute, Hsinchu (TW)

(72) Inventors: Yi-Chang Du, Taoyuan (TW); Yi-Hsiu Pan, Hsinchu County (TW); Li-Duan Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/528,655

(22) Filed: Aug. 1, 2019

(65) Prior Publication Data

US 2020/0043628 A1 Feb. 6, 2020

Related U.S. Application Data

(60) Provisional application No. 62/713,497, filed on Aug. 1, 2018.

(51) Int. Cl.
*H01B 1/12* (2006.01)
*H01G 9/15* (2006.01)

(52) U.S. Cl.
CPC .............. *H01B 1/128* (2013.01); *H01B 1/127* (2013.01); *H01G 9/15* (2013.01)

(58) Field of Classification Search
CPC ....................................................... H01G 11/04
USPC ........................................................ 361/523
See application file for complete search history.

(56) References Cited

U.S. PATENT DOCUMENTS

| | | | |
|---|---|---|---|
| 6,987,663 B2 | 1/2006 | Merker et al. | |
| 8,551,366 B2 | 10/2013 | Yoshida et al. | |
| 8,920,971 B2 | 12/2014 | Stromme et al. | |
| 9,243,073 B2 | 1/2016 | Kimura et al. | |
| 2016/0240323 A1* | 8/2016 | Chacko ................. | H01G 11/04 |
| 2017/0317378 A1 | 11/2017 | Matsumura | |

FOREIGN PATENT DOCUMENTS

| | | |
|---|---|---|
| CN | 103160122 | 6/2013 |
| TW | I249468 | 2/2006 |
| TW | 201350634 | 12/2013 |
| WO | 2018123150 | 7/2018 |

OTHER PUBLICATIONS

"Office Action of Taiwan Counterpart Application", dated May 7, 2020, p. 1-p. 9.

(Continued)

*Primary Examiner* — Khanh T Nguyen
(74) *Attorney, Agent, or Firm* — JCIPRNET

(57) ABSTRACT

Provided is a conductive polymer composite material including an intrinsically conductive polymer, a cellulose nanofiber, and a polyol, wherein the surface of the cellulose nanofiber contains a carboxylic group. In one embodiment, based on 100 parts by weight of the intrinsically conductive polymer, the content of the cellulose nanofiber is 1 to 100 parts by weight, and the content of the polyol is 10 to 3,000 parts by weight. A capacitor including the conductive polymer composite material is also provided.

14 Claims, 1 Drawing Sheet

(56) References Cited

OTHER PUBLICATIONS

Youngsang Ko et al., "Vacuum-assisted bilayer PEDOT:PSS/cellulose nanofiber composite film for self-standing, flexible, conductive electrodes", Carbohydrate Polymers, vol. 173, Oct. 1, 2017, pp. 383-391.

Tiejun Wang et al., "Effects of poly(ethylene glycol) on electrical conductivity of poly(3,4-ethylenedioxythiophene)—poly(styrenesulfonic acid) film", Applied Surface Science, vol. 250, Issues 1-4, Aug. 31, 2005, pp. 188-194.

* cited by examiner

CONDUCTIVE POLYMER COMPOSITE MATERIAL AND CAPACITOR

CROSS-REFERENCE TO RELATED APPLICATION

This application claims the priority benefit of U.S. provisional application Ser. No. 62/713,497, filed on Aug. 1, 2018. The entirety of the above-mentioned patent application is hereby incorporated by reference herein and made a part of this specification.

TECHNICAL FIELD

The present invention relates to a polymer composite material and an application thereof, in particular to a conductive polymer composite material and a capacitor.

BACKGROUND

Improving the conductivity of electrolytes has long been a major issue in the development of electrolytic capacitors. The highly conductive electrolyte can reduce the equivalent series resistance of the capacitor, achieving low impedance at high frequency and high reliability. Since the conductive polymer has higher conductivity than the liquid electrolyte or the solid organic semiconductor complex salt, such as 7,7,8,8-tetracyanoquinodimethane (TCNQ) complex salt, used in the conventional electrolytic capacitor and has moderate high temperature insulation property, it has become the development trend of solid electrolytes used in the current electrolytic capacitors. Conventional conductive polymers have poor film forming properties and cannot completely cover the surface of the dielectric layer of the capacitor, resulting in an increase in interface resistance between the conductive polymer and the dielectric layer material.

SUMMARY

Accordingly, the disclosure provides a conductive polymer composite material, which can solve the interface impedance between a solid electrolyte containing an intrinsically conductive polymer and a dielectric layer material and other problems.

The disclosure provides a conductive polymer composite material that includes an intrinsically conductive polymer, a cellulose nanofiber (CNF), and a polyol, in which the cellulose nanofiber surface contains a carboxylic group. Further, based on 100 parts by weight of the intrinsically conductive polymer, the content of the cellulose nanofiber is 1 to 100 parts by weight, and the content of the polyol is 10 to 3,000 parts by weight.

A solid electrolytic capacitor is provided with the conductive polymer composite material as described above.

Based on the above, in the embodiments, the intrinsically conductive polymer is blended with a cellulose nanofiber and a polyol, so as to reduce the interface impedance of the capacitor and improve the low impedance at high frequency of the capacitor.

In order to make the aforementioned and other objectives and advantages of the present invention comprehensible, embodiments accompanied with figures are described in detail below.

DETAILED DESCRIPTION OF DISCLOSED EMBODIMENTS

Figure 1:
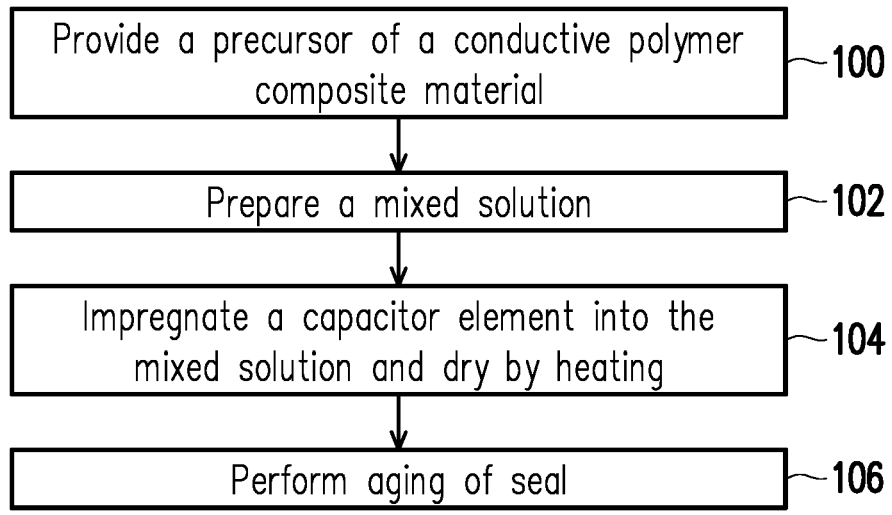
FIG. 1 is a flow chart of a method of preparing a capacitor in accordance with an embodiment of the disclosure.

One of exemplary embodiments provides a conductive polymer composite material that includes an intrinsically conductive polymer, a cellulose nanofiber, and a polyol. In one embodiment, based on 100 parts by weight of the intrinsically conductive polymer, the content of the cellulose nanofiber is 1 to 100 parts by weight, and the content of the polyol is 10 to 3,000 parts by weight. In another embodiment, based on 100 parts by weight of the intrinsically conductive polymer, the content of the cellulose nanofiber is 1 to 50 parts by weight, and the content of the polyol is from 50 to 2,000 parts by weight. In another embodiment, based on 100 parts by weight of the intrinsically conductive polymer, the content of the cellulose nanofiber is 1 to 50 parts by weight, and the content of the polyol is 100 to 1,000 parts by weight.

I. Materials

1. Intrinsically Conductive Polymer

The intrinsically conductive polymer of the embodiments may include polythiophene, polypyrrole, poly-p-styrene, polyphenylene sulfide or polyaniline and a derivative thereof, such as poly(3,4-alkylenedioxythiophene), poly(3,4-ethylenedioxythiophene) (PEDOT), poly(3,4-propylenedioxythiophene) (PProDOT), poly(thieno[3,4-b]-1,4-dioxin-2-methanol) or a copolymer containing the above structure, such as PEDOT-co-polyethylene glycol, or a blend, such as PEDOT-poly(vinylpyrrolidone) blend, PEDOT-polyethylene glycol blend, and PEDOT-polyvinyl alcohol blend.

In order to allow the intrinsically conductive polymers in the conductive polymer composite material to have excellent electrical conductivity, a doped intrinsically conductive polymer may be employed. The dopant may include sulfonic acids, such as methanesulfonic acid, benzenesulfonic acid, or p-toluenesulfonic acid; sulfonic acid polymers, such as poly(styrene sulfonic acid) (PSS), sulfonated polyether ether ketone, or a copolymer thereof, such as polystyrenesulfonic acid-co-poly(vinylpyrrolidone), polystyrenesulfonic acid-co-polyethylene glycol; carboxylic acids, such as benzoic acid, benzenedicarboxylic acid, or succinic acid; carboxylic acid polymers, such as polyacrylic acid or a copolymer thereof; amino acids, such as glycine; phosphoric acids, such as phosphoric acid, Etidronic acid, diphenyl phosphate; a derivative thereof, or a combination thereof.

The method of doping the intrinsically conductive polymer may include first polymerizing into a conjugated polymer and then doping with a dopant; adding a dopant during the polymerization of a intrinsically conductive polymer; or using the by-product generated when the polymerization of a conjugated polymer is initiated with an oxidizing agent as a dopant. For example, the p-toluenesulfonic acid produced when the polymerization of the conjugated polymer is initiated with iron p-toluenesulfonate can be used as a dopant. The amount of the dopant disclosed in the embodiments is not limited by the disclosure. In some embodiments, in addition to enhancing the conductivity of the intrinsically conductive polymer, excess dopant can also improve the physical properties of the intrinsically conductive polymer, such as the suspension property in solution. In one embodiment, the content of dopant is 10 to 1,000 parts by weight based on 100 parts by weight of the intrinsically conductive polymer. The intrinsically conductive polymer as described in the embodiments includes a doped mixture of an intrinsically conductive polymer and a dopant, such as poly(3,4-ethylenedioxythiophene):poly(p-styrenesulfonate) (PEDOT:PSS).

2. Cellulose Nanofiber

The nanofiber structure of the cellulose nanofiber used in the embodiments has a diameter of 1 nm to 900 nm and a length of 10 nm to 1,000 μm.

The preparation of the cellulose nanofiber can be carried out by mechanical decomposition, enzymatic decomposition or chemical oxidative decomposition of plant fibers.

In one embodiment, the preparation method of the cellulose nanofiber is exemplified by chemical oxidative decomposition, which includes oxidatively decomposing the amorphous region of the plant fiber in an alkaline solution under the action of TEMPO (2,2,6,6-tetramethylpiperidine-1-oxyl), sodium bromide and sodium hypochlorite to leave a cellulose nano-microcrystalline block having high crystallinity; and then breaking the hydrogen bonds between cellulose nano-microcrystallines by homogenizer or ultrasonic wave or other ways to form a uniform dispersion.

In one embodiment, the cellulose nanofiber contains a carboxylic group.

3. Polyol

The polyol may be a compound having three or more hydroxyl groups. The polyol may include aliphatic polyol compound such as glycerol, pentose, hexose, sorbitol, polyglycerol or a combination thereof; or aromatic polyol compound such as gallic acid and the like. The amount of the polyol used varies greatly depending on the type of polyol selected, the relative content of cellulose nanofibers and other factors. In one embodiment, the content of the polyol is 10 to 3,000 parts by weight based on 100 parts by weight of the intrinsically conductive polymer.

4. Additive

The above conductive polymer composite material may be added with another compound to adjust its characteristics to meet various purposes. For example, a cross-linking resin such as an epoxy resin may be added to make the electrolyte structure more stable.

In order to adjust characteristics of the conductive polymer, such as dispersibility, pH, and the like, one or more nitrogen-containing compounds may be used for adjustment. In one embodiment, a nitrogen-containing compound is added to adjust the pH of the aqueous precursor solution of the conductive polymer composite material to be not less than 2. The nitrogen-containing compound may include primary amines, secondary amines, tertiary amines or quaternary amines. The nitrogen-containing compound may include amine; amide such as formamide, acetamide, caprolactam or a combination thereof; imide such as succinimide; urethane such as ethyl carbamate; imidazole such as imidazole, 1-methylimidazole, 2-methylimidazole, or a combination thereof; triazole; pyridine such as pyridine; pyrrolidone such as N-methylpyrrolidone; urethane such as dimethyl urethane, tetramethyl urethane, or a combination thereof; urea, or a combination thereof. In one embodiment, the nitrogen-containing compound includes imidazole, imidazoline, urethane, imide, amide, urea, pyridine, melamine, triazole or a combination thereof. In another embodiment, the nitrogen-containing compound includes polyacrylamide, polyvinylpyrrolidone, polyvinylpyridine or polyethyleneimine, polyamide, polyimide, or a combination thereof. The nitrogen-containing compound may have a small molecular structure or a polymer structure. The amount of the nitrogen-containing compound disclosed in the embodiment is not limited by the disclosure. It has a wide range of use depending on the characteristics of the intrinsically conductive polymer selected and the nature of the nitrogen-containing compound. For example, if a higher amount of the dopant for the intrinsically conductive polymer is used, a higher amount of the nitrogen-containing compound is used to adjust its pH. In one embodiment, the content of the nitrogen-containing compound is 1 to 900 parts by weight based on 100 parts by weight of the intrinsically conductive polymer.

In order to impregnate the conductive polymer composite material of the embodiment into a capacitor, or to better mix and disperse the intrinsically conductive polymer and the cellulose nanofiber, an appropriate amount of solvent may be used for dispersing the precursor of the conductive polymer compound material. The precursor of the conductive polymer compound material described herein includes an intrinsically conductive polymer, a cellulose nanofiber, a polyol, a nitrogen-containing compound, and the like. The solvent content is not limited by the disclosure, as long as the solvent can help reduce the viscosity of the suspension, disperse or dissolve the mixture. In one embodiment, the content of solvent is 10 to 1,000 parts by weight based on one part by weight of the intrinsically conductive polymer.

The above solvent may include water such as DI water; ester such as γ-butyrolactone; carbonate such as ethylene carobonate (EC), propylene carbonate (PC), or a combination thereof; ether such as diethylene glycol dibutyl ether, polyethylene glycol; ketone such as methyl isobutyl ketone; alcohol such as ethanol, ethylene glycol or a combination thereof; amine; amide such as formamide, acetamide, caprolactam or a combination thereof; imide; urethane; imidazole such as 1-methylimidazole, 2-methylimidazole, or a combination thereof; triazole; pyridine such as pyridine; pyrrolidone such as N-methylpyrrolidone; urethane such as dimethyl urethane, tetramethyl urethane, or a combination thereof.

II. Capacitor

FIG. 1 is a flow chart of a method of preparing a capacitor in accordance with an embodiment of the disclosure.

Referring to FIG. 1, step 100 is firstly performed to provide a precursor of a conductive polymer compound material. The precursor of the conductive polymer compound material includes an intrinsically conductive polymer, a cellulose nanofiber, a polyol, a solvent, a nitrogen-containing compound, and the like.

Then, step 102 is performed to prepare a mixed solution of the conductive polymer composite material of the embodiment. In one embodiment, the intrinsically conductive polymer, the cellulose nanofiber, and the polyol are uniformly mixed with each other in a physical manner, and a nitrogen-containing compound is appropriately added to adjust the characteristics of the conductive polymer composite material. In one embodiment, the nitrogen-containing compound is added such that the pH of the aqueous precursor solution of the conductive polymer composite material is not less than 2. In one embodiment, the intrinsically conductive polymer, the cellulose nanofiber, and the polyol may be physically bonded to each other by hydrogen bonding, van der Waals force, and the like.

Next, step 104 is performed by impregnating a capacitor element into the mixed solution and drying by heating (at a maximum temperature of 170° C.) to form a conductive polymer composite material.

A composite material is prepared by adding an intrinsically conductive polymer monomer to a mixed solution containing at least a cellulose nanofiber and a polyol; and performing electrochemical polymerization on the surface of a dielectric layer or performing oxidative polymerization with an oxidizing agent, so as to form a conductive polymer composite material. The oxidizing agent used in the above oxidative polymerization method may include salts containing iron ions, salts containing copper ions, or persulfates. The above salts containing iron ions may include iron benzenesulfonate, iron p-toluenesulfonate, iron chloride, iron nitrate, iron sulfate, or a combination thereof. In addition, the synthesized conductive polymer (such as poly(3,4-ethylenedioxythiophene):poly(styrenesulfonate), PEDOT:PSS) and a mixed solution containing at least a cellulose nanofiber and a polyol are coated on or impregnated into the surface of the capacitor dielectric layer and then dried by heating to remove the solvent.

Then, step 106 is performed for the aging of seal. The conductive polymer solid electrolytic capacitor of the embodiments can be formed by various known methods, and is not limited to the above embodiments.

Figure 2:
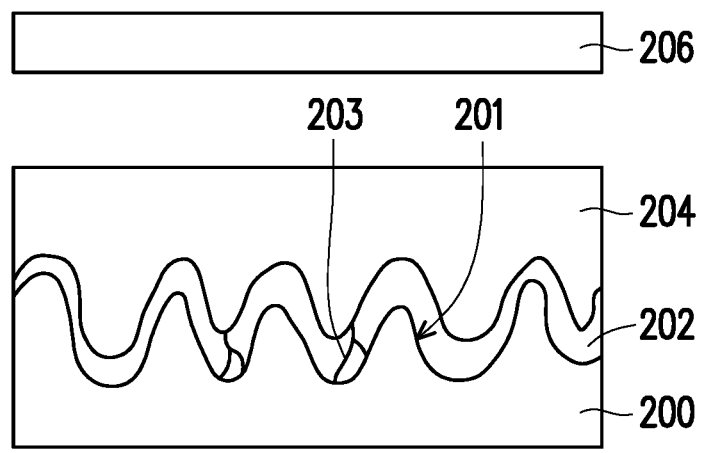
FIG. 2 is a partial cross-sectional view of a capacitor in accordance with an embodiment of the disclosure.

FIG. 2 is a cross-sectional view of a capacitor in accordance with an embodiment of the disclosure.

Referring to FIG. 2, the capacitor of the embodiment includes a metal electrode 200, a dielectric layer 202, a conductive polymer composite material 204, and a metal layer 206.

The metal layer 200 serves as an electrode layer, such as a positive electrode layer. The material of the metal layer 200 includes aluminum, tantalum, niobium or an alloy thereof. In one embodiment, the metal layer 200 may be a meso-porous substrate having a plurality of holes 201.

The dielectric layer 202 is disposed on the metal layer 200. Specifically, the dielectric layer 202 is disposed on the surfaces of the metal layer 200 and the holes 201. In one embodiment, the dielectric layer 202 is disposed directly on the surface of the metal layer 200. In another embodiment, the dielectric layer 202 is disposed over the metal layer 200, and there are other layers between the dielectric layer 202 and the metal layer 200.

The dielectric layer 202 used in the capacitor of the embodiment may be a metal oxide or an organic compound. The metal oxide may be an oxide of aluminum, niobium, tantalum, titanium, zirconium or an alloy thereof. The shape of the dielectric layer may be a porous ingot formed by sintering a sheet or a pellet, and the dielectric layer may be etched as appropriate to increase its specific surface area. The positive electrode may be treated by electrochemical electrolysis to form a dielectric layer, or a dielectric layer may be formed by other means, such as sputtering of an inorganic oxide, an organic-inorganic complex, or a multi-layer structure thereof. The organic compound dielectric layer may be a polyester, a cellulose nanofiber or the like.

It is noted that, in a re-forming step of the dielectric layer 202, for example, when anodized into aluminum oxide, the aluminum oxide dielectric layer is of a heterogeneous crystal structure, and cracks 203 are easily formed at the crystal boundary of aluminum oxide, causing an increase in leakage current. However, in the capacitor of the embodiment, the conductive polymer composite material 204 having a good covering property is disposed on the dielectric layer 202, so the cracks 203 are effectively repaired, the conventional leakage phenomenon is not generated, and the impedance is accordingly reduced and the capacitor yield is increased.

The conductive polymer composite material 204 is used as a solid electrolytic layer or a solid-liquid mixed electrolytic layer. The conductive polymer composite material 204 is disposed on the dielectric layer 202. In one embodiment, the conductive polymer composite material 204 includes an intrinsically conductive polymer, a cellulose nanofiber, and a polyol.

The conductive polymer composite material disclosed in the embodiment may be directly distributed on the dielectric layer of the capacitor, or a single layer or multiple layers of different materials, such as siloxane, polyethylene glycol, PVA, etc., are added between the conductive polymer composite material and the dielectric layer as needed.

The conductive layer 206 is disposed on the conductive polymer composite material 204. The conductive layer 206 serves as a negative electrode of the capacitor. The negative electrode of the capacitor disclosed in the embodiment may be a metal foil such as an aluminum foil, and the negative electrode may be electrochemically etched to increase its specific surface area as appropriate. Other materials such as carbon or titanium may be attached to the surface of the aluminum foil to become a negative electrode to increase its chemical stability or capacitance. In some embodiments, for example, the negative electrode may be an evaporated metal, a conductive silver colloid or colloidal carbon.

Next, a separator paper may be interposed between the positive electrode and the negative electrode as needed, and then wound into a solid electrolytic capacitor element.

The capacitor structure disclosed in the embodiments may be of a wound or layered stack structure.

III. Experiment

Example 1

A separator paper is interposed between the aluminum foil positive electrode of the aluminum oxide dielectric layer formed by the electrochemical electrolysis reaction at 67V and the carbon foil negative electrode having high surface area and then wound into a solid electrolytic capacitor element. The element can selectively repair the damaged aluminum oxide dielectric layer through an aqueous solution of an organic acid.

After the element was impregnated into a mixture consisting of components shown in Table 1, the temperature was raised to remove the solvent. During heating, the maximum temperature can reach 170° C. to ensure no solvent residue. This impregnation and drying procedure was repeated twice to ensure that the conductive polymer mixture can be sufficiently filled in the gap of the dielectric layer.

The solid electrolytic capacitor element was then sealed with an aluminum case and a rubber cap and energized at 125° C. and 35 V for half an hour. Capacitance characteristics were then measured at room temperature, and the results were shown in Table 2.

TABLE 1

| No. | PEDOT:PSS 2% aq. (parts by weight) | Imidazole (parts by weight) | Glycerin (parts by weight) | CNF-H (1 wt % aq) (parts by weight) | DI water (parts by weight) |
|---|---|---|---|---|---|
| Experiment 1 | 2 | 0.2 | | | 29.8 |
| Experiment 2 | 2 | 0.2 | 4 | | 25.98 |
| Experiment 3 | 2 | 0.2 | | 0.12 | 17.98 |
| Experiment 4 | 2 | 0.2 | 4 | 0.12 | 13.98 |

Note 1:

PEDOT:PSS 2 wt % aq. was synthesized on our own by the synthesis method disclosed in Example 1 of U.S. Pat. No. 7,411,779, and dispersed in water to became an aqueous solution having a PEDOT:PSS content of 2 wt %. Parts by weight in examples were based on the actual weight of PEDOT:PSS.

Note 2:

CNF-H was a cellulose nanofiber containing carboxylic acid-COOH on the surface. It was synthesized on our own by the method described in the journal Biomacromolecules (2010) 11, p1696-1700, and dispersed in water to became an aqueous solution having a CNF-H content of 1 wt %. Parts by weight in the examples was calculated based on the actual weight of CNF-H.

TABLE 2

| No. | | Capacitance (μF) | 120 Hz ESR (mΩ) | DF (%) | 100 kHz ESR (mΩ) |
|---|---|---|---|---|---|
| Experiment 1 | Mean | 91.64 | 4763.80 | 32.47 | 121.16 |
| | Standard deviation | 6.62 | 1125.75 | 5.34 | 29.12 |
| Experiment 2 | Mean | 104.60 | 1577.60 | 12.44 | 27.06 |
| | Standard deviation | 1.37 | 196.72 | 1.60 | 0.43 |
| Experiment 3 | Mean | 84.90 | 4288.00 | 27.38 | 147.82 |
| | Standard deviation | 4.11 | 242.69 | 0.53 | 3.27 |
| Experiment 4 | Mean | 125.74 | 618.74 | 5.86 | 20.68 |
| | Standard deviation | 2.90 | 36.17 | 0.26 | 1.01 |

Capacitor characteristics after charging and aging

Comparing the capacitor characteristics of Experiment 1 and Experiment 2 in Table 2, it can be seen that, when glycerin is added to the conductive polymer aqueous solution, the capacitance of the capacitor can be increased, and the dissipation factor (DF) and the equivalent series resistance (ESR) at 100 kHz of the capacitor can be reduced. The DF value represents the case where the conductive polymer is coated on the aluminum oxide. Generally, a lower DF represents a better coating. The 100 kHz ESR represents the conductivity of the solid electrolyte. Generally, a lower conductivity represents a better conductivity.

It can be seen from the results of Experiment 3 that, when only the cellulose nanofibers is added to the aqueous solution of the conductive polymer, the capacitance is decreased, and DF and 100 kHz ESR are increased. However, the results of Experiment 4 show that, when glycerin and cellulose nanofibers are simultaneously added to the aqueous solution of the conductive polymer, the capacitor has the highest capacitance, and the lowest DF and 100 kHz ESR values, which helps to reduce the interface impedance between the conductive polymer and the oxide film and enhance film forming properties. This results show that the cellulose nanofibers and glycerin have a synergistic effect.

Example 2

Except that the composition of the aqueous solution of the conductive polymer was as shown in Table 3, the other steps were as in Example 1. Capacitor characteristics were shown in Table 4.

TABLE 3

| No. | PEDOT:PSS 2% aq. (parts of weight) | Imidazole | Glycerin (parts by weight) | Cellulose (parts by weight) | | | | | DI water (parts by weight) |
|---|---|---|---|---|---|---|---|---|---|
| | | | | CNF-H 1 wt % aq | PVP 3.5K 1 wt % ag | PVP 360K 1 wt % ag | PEG 400 1 wt % aq | PAC 2k 1 wt % aq | |
| Experiment 5 | 2 | 0.2 | 4 | 0.24 | | | | | 1.98 |
| Control 1 | 2 | 0.2 | 4 | | 0.24 | | | | 1.98 |
| Control 2 | 2 | 0.2 | 4 | | | 0.24 | | | 1.98 |
| Control 3 | 2 | 0.2 | 4 | | | | 0.24 | | 1.98 |
| Control 4 | 2 | 0.2 | 4 | | | | | 0.24 | 1.98 |

Note 1: PVP3.5k represents a poly(vinylpyrrolidone) with a molecular weight of 3,500
Note 2: PVP360K represents for poly(vinylpyrrolidone) with a molecular weight of 360,000
Note 3: PEG400 represents polyethylehe glycol with a molecular weight of 400
Note 4: PAC2k represents polyacrylic acid with a molecular weight of 2,000

TABLE 4

| No. | | Capacitance (μF) | 120 Hz ESR (mΩ) | DF (%) | 100 kHz ESR (mΩ) | 35 V LC (μA) |
|---|---|---|---|---|---|---|
| Experiment 5 | Mean | 120.30 | 696.36 | 6.32 | 19.92 | 16.70 |
| | Standard deviation | 2.35 | 32.74 | 0.39 | 0.49 | 21.81 |
| Control 1 | Mean | 115.92 | 1216.80 | 10.63 | 41.44 | 23.52 |
| | Standard deviation | 2.06 | 62.19 | 0.47 | 1.81 | 17.32 |
| Control 2 | Mean | 115.96 | 1021.50 | 8.91 | 25.62 | 24.78 |
| | Standard deviation | 3.00 | 108.49 | 0.77 | 0.63 | 19.22 |

Capacitor characteristics after charging and aging

TABLE 4-continued

| | | Capacitor characteristics after charging and aging | | | | |
|---|---|---|---|---|---|---|
| No. | | Capacitance (μF) | 120 Hz ESR (mΩ) | DF (%) | 100 kHz ESR (mΩ) | 35 V LC (μA) |
| Control 3 | Mean | 122.14 | 1178.30 | 10.84 | 37.88 | 41.58 |
| | Standard deviation | 1.77 | 53.81 | 0.39 | 0.98 | 28.73 |
| Control 4 | Mean | 104.98 | 1021.80 | 8.07 | 36.02 | 12.48 |
| | Standard deviation | 4.54 | 83.05 | 0.47 | 1.52 | 7.08 |

This example compares the effects of the addition of cellulose nanofibers and different polymer additives to an aqueous solution of the conductive polymer on the characteristics of the capacitor. The results of Table 4 show that when the type of additive is changed from CNF-H of Experiment 5 to polymer additives having different molecular weights such as PVP, PEG, and PAC (such as Controls 1 to 4), the capacitance of the obtained capacitor is lower than that of the former, and the DF and 100 kHz ESR of the capacitor are also higher than that of the former.

Example 3

Except that the composition of the aqueous solution of the conductive polymer was as shown in Table 5, and the other steps were as in Example 1. Capacitor characteristics were shown in Table 6.

TABLE 5

| No. | PEDOT:PSS 2% aq. | Imidazole | Sorbitol | CNF-H 1 wt % aq | DI water |
|---|---|---|---|---|---|
| Experiment 1 | 2 | 0.2 | — | — | 29.98 |
| Experiment 6 | 2 | 0.2 | — | 0.24 | 5.98 |
| Experiment 7 | 2 | 0.2 | 4 | — | 25.98 |
| Experiment 8 | 2 | 0.2 | 4 | 0.24 | 1.98 |

TABLE 6

| | | Capacitor characteristics after charging and aging | | | | |
|---|---|---|---|---|---|---|
| No. | | Capacitance (μF) | 120 Hz ESR (mΩ) | DF (%) | 100 kHz ESR (mΩ) | 35 V LC (μA) |
| Experiment 1 | Mean | 91.64 | 4763.80 | 32.47 | 121.16 | 17.88 |
| | Standard deviation | 6.62 | 1125.75 | 5.34 | 29.12 | 6.54 |
| Experiment 6 | Mean | 76.88 | 4579.80 | 25.83 | 203.84 | 43.06 |
| | Standard deviation | 10.25 | 1154.19 | 3.28 | 58.94 | 36.15 |
| Experiment 7 | Mean | 122.46 | 1468.18 | 13.55 | 33.92 | 6.18 |
| | Standard deviation | 1.51 | 114.36 | 1.05 | 1.53 | 1.61 |
| Experiment 8 | Mean | 121.72 | 938.14 | 8.60 | 24.32 | 6.68 |
| | Standard deviation | 0.58 | 50.55 | 0.45 | 0.54 | 4.10 |

In this example, the glycerin used in Example 1 was changed to a different polyol (such as sorbitol). It can be seen from the results of Table 6 that, when sorbitol and CNF-H are simultaneously present in the water-soluble aqueous solution of the conductive polymer, the capacitor can exhibit optimum capacitance and DF, ESR. It is shown that CNF-H interacts extensively with polyols of different structures to produce a synergistic effect on capacitor characteristics.

Based on the above, the embodiments solve the problems of interface impedance between the electrolyte containing the intrinsically conductive polymer and the dielectric layer material. The intrinsically conductive polymer is blended with a cellulose nanofiber and a polyol, so as to reduce the interface impedance of the capacitor and improve the impedance at high and low frequency of the capacitor.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A conductive polymer composite material, comprising:
an intrinsically conductive polymer;
a cellulose nanofiber; and
a polyol,
wherein a surface of the cellulose nanofiber contains a carboxylic group, and
wherein based on 100 parts by weight of the intrinsically conductive polymer, a content of the cellulose nanofiber is 1 to 100 parts by weight, and a content of the polyol is 10 to 3,000 parts by weight.

2. The conductive polymer composite material according to claim 1, wherein the intrinsically conductive polymer, the cellulose nanofiber, and the polyol are uniformly mixed with each other.

3. The conductive polymer composite material according to claim 1, wherein the intrinsically conductive polymer comprises polyaniline, polypyrrole, polythiophene, poly(p-phenylene vinylene), polyphenylene sulfide, a derivative thereof, or a combination thereof.

4. The conductive polymer composite material according to claim 1, wherein the intrinsically conductive polymer is a doped intrinsically conductive polymer.

5. The conductive polymer composite material according to claim 4, wherein the doped intrinsically conductive polymer is poly(3,4-ethylenedioxythiophene):poly(styrenesulfonate) (PEDOT:PSS) or a derivative thereof.

6. The conductive polymer composite material according to claim 1, wherein the polyol comprises three or more hydroxyl groups.

7. The conductive polymer composite material according to claim 6, wherein the polyol comprises an aliphatic polyol compound or an aromatic polyol compound, and the aliphatic polyol compound comprises glycerol, pentose, hexose, sorbitol, polyglycerol or a combination thereof, and the aromatic polyol compound comprises gallic acid.

8. The conductive polymer composite material according to claim 1, further comprising a nitrogen-containing compound, wherein the nitrogen-containing compound comprises imidazole, imidazoline, urethane, imide, amide, urea, pyridine, melamine, triazole or a combination thereof.

9. The conductive polymer composite material according to claim 8, wherein a content of the nitrogen-containing compound is 1 to 900 parts by weight based on 100 parts by weight of the intrinsically conductive polymer.

10. The conductive polymer composite material according to claim 8, wherein the nitrogen-containing compound is a nitrogen-containing polymer, and the nitrogen-containing polymer comprises polyacrylamide, polyvinylpyrrolidone, polvinylpyridine, polyethyleneimine, polyamide, polyimide or a combination thereof.

11. The conductive polymer composite material according to claim 1, further comprising a dopant, wherein the dopant comprises sulfonic acid compound, sulfonic acid polymer, carboxylic acid compound, carboxylic acid polymer, amino acid, phosphoric acid compound, a derivative thereof, or a combination thereof.

12. The conductive polymer composite material according to claim 11, wherein the dopant comprises methanesulfonic acid, benzenesulfonic acid, p-toluenesulfonic acid, poly(styrenesulfonate) (PSS), sulfonated polyether ether ketone, polystyrenesulfonic acid-co-poly(vinylpyrrolidone), polystyrenesulfonic acid-co-polyethylene glycol, benzoic acid, benzenedicarboxylic acid, or succinic acid, polyacrylic acid, glycine, phosphoric acid, Etidronic acid, diphenyl phosphate or a combination thereof.

13. The conductive polymer composite material according to claim 1, wherein the cellulose nanofiber has a diameter of 1 nm to 900 nm and a length of 10 nm to 1,000 μm.

14. A solid electrolytic capacitor, comprising the conductive polymer composite material according to claim 1.

\* \* \* \* \*